(12) United States Patent
Glaser et al.

(10) Patent No.: US 12,056,932 B2
(45) Date of Patent: *Aug. 6, 2024

(54) MULTIFACTOR CHECKOUT APPLICATION

(71) Applicant: Grabango Co., Berkeley, CA (US)

(72) Inventors: William Glaser, Berkeley, CA (US);
Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,780

(22) Filed: Oct. 15, 2022

(65) Prior Publication Data

US 2023/0041775 A1 Feb. 9, 2023

Related U.S. Application Data

(63) Continuation of application No. 17/178,748, filed on Feb. 18, 2021, now Pat. No. 11,501,537, which is a continuation of application No. 16/162,292, filed on Oct. 16, 2018, now Pat. No. 10,963,704.

(60) Provisional application No. 62/572,819, filed on Oct. 16, 2017.

(51) Int. Cl.

| *G07G 1/00* | (2006.01) |
| *G06Q 20/20* | (2012.01) |
| *G06V 20/52* | (2022.01) |
| *G07G 3/00* | (2006.01) |
| *G08B 13/196* | (2006.01) |
| *G08B 13/24* | (2006.01) |
| *H04W 4/35* | (2018.01) |
| *H04W 4/80* | (2018.01) |

(52) U.S. Cl.
CPC ............. *G06V 20/52* (2022.01); *G06Q 20/20* (2013.01); *G06Q 20/202* (2013.01); *G06Q 20/208* (2013.01); *G07G 1/0036* (2013.01); *G07G 1/0063* (2013.01); *G07G 3/00* (2013.01); *G08B 13/196* (2013.01); *G08B 13/2402* (2013.01); *G08B 13/2417* (2013.01); *H04W 4/35* (2018.02); *H04W 4/80* (2018.02)

(58) Field of Classification Search
CPC ............. G06K 9/00771; G06Q 20/202; G06Q 20/208; G06Q 20/206; G07G 3/00; G07G 1/0063; G07G 1/0036; G08B 13/196; G08B 13/2402; G08B 13/2417; H04W 4/80; H04W 4/35
See application file for complete search history.

(56) References Cited

U.S. PATENT DOCUMENTS

| 8,396,758 B2 * | 3/2013 | Paradise ............ G06Q 30/0224 705/26.1 |
| 9,412,099 B1 * | 8/2016 | Tyree ........................ A47F 9/04 |
| 9,911,290 B1 * | 3/2018 | Zalewski ............... G06Q 20/12 |

(Continued)

*Primary Examiner* — Howard D Brown, Jr.
(74) *Attorney, Agent, or Firm* — Alpine Patents LLC; Brian Van Osdol

(57) ABSTRACT

A system and method for interaction monitoring in a retail environment that includes executing a first monitoring system and thereby generating a first evaluation of customer selection of items; executing a second monitoring system and thereby generating a second evaluation of customer selection of items; determining monitoring alignment between the first evaluation and the second evaluation of a first customer; and triggering an action in response to the monitoring alignment.

20 Claims, 9 Drawing Sheets

(56) References Cited

U.S. PATENT DOCUMENTS

| | | | |
|---|---|---|---|
| 2013/0223673 A1* | 8/2013 | Davis | G06F 3/147 |
| | | | 235/375 |
| 2014/0263631 A1* | 9/2014 | Muniz | G06Q 20/208 |
| | | | 235/383 |
| 2015/0227890 A1* | 8/2015 | Bednarek | G06Q 10/0833 |
| | | | 705/26.81 |
| 2017/0039613 A1* | 2/2017 | Kaehler | G02B 27/0172 |
| 2017/0161703 A1* | 6/2017 | Dodia | G07G 1/0072 |
| 2017/0278175 A1* | 9/2017 | Park | G06Q 30/0603 |
| 2019/0114488 A1* | 4/2019 | Glazer | G08B 13/2402 |
| 2019/0333039 A1* | 10/2019 | Glaser | G06Q 20/202 |
| 2020/0079412 A1* | 3/2020 | Ramanathan | G08B 13/19652 |

\* cited by examiner

Smart cart

Security Tag Barrier System profile prediction system

POS monitoring system

MULTIFACTOR CHECKOUT APPLICATION

CROSS-REFERENCE TO RELATED APPLICATIONS

This Application is a Continuation Application of U.S. patent application Ser. No. 17/178,748, filed on 18 Feb. 2021, which is a Continuation Application of U.S. Pat. No. 10,963,704, Granted on 30 Mar. 2021, and filed on 16 Oct. 2018, which claims the benefit of U.S. Provisional Application No. 62/572,819, filed on 16 Oct. 2017, all of which are incorporated in their entirety by this reference.

TECHNICAL FIELD

This invention relates generally to the field of computer vision applications, and more specifically to a new and useful system and method for multiple-factor verification of vision-based interactions.

BACKGROUND

Computer vision, sensor fusion, and other forms of activity monitoring have seen some early applications to commerce and payment and early-stage exploration for future applications. Many of existing applications are limited in nature offering only basic functionality such as error prone security systems or general environmental statistics. Exploration in more involved user interactions such as checkout free shopping have been exposed to be vulnerable to adversarial attacks. In many of the current solutions, a singular approach to sensing activity in an environment is applied, which exposes the systems to a wide range of attack surfaces through which the system may fail for legitimate actors or be gamed by exploitative actors. Thus, there is a need in the computer vision field to create a new and useful system and method for applications in multiple-factor verification of vision-based interactions. This invention provides such a new and useful system and method.

DESCRIPTION OF THE EMBODIMENTS

Figure 1:
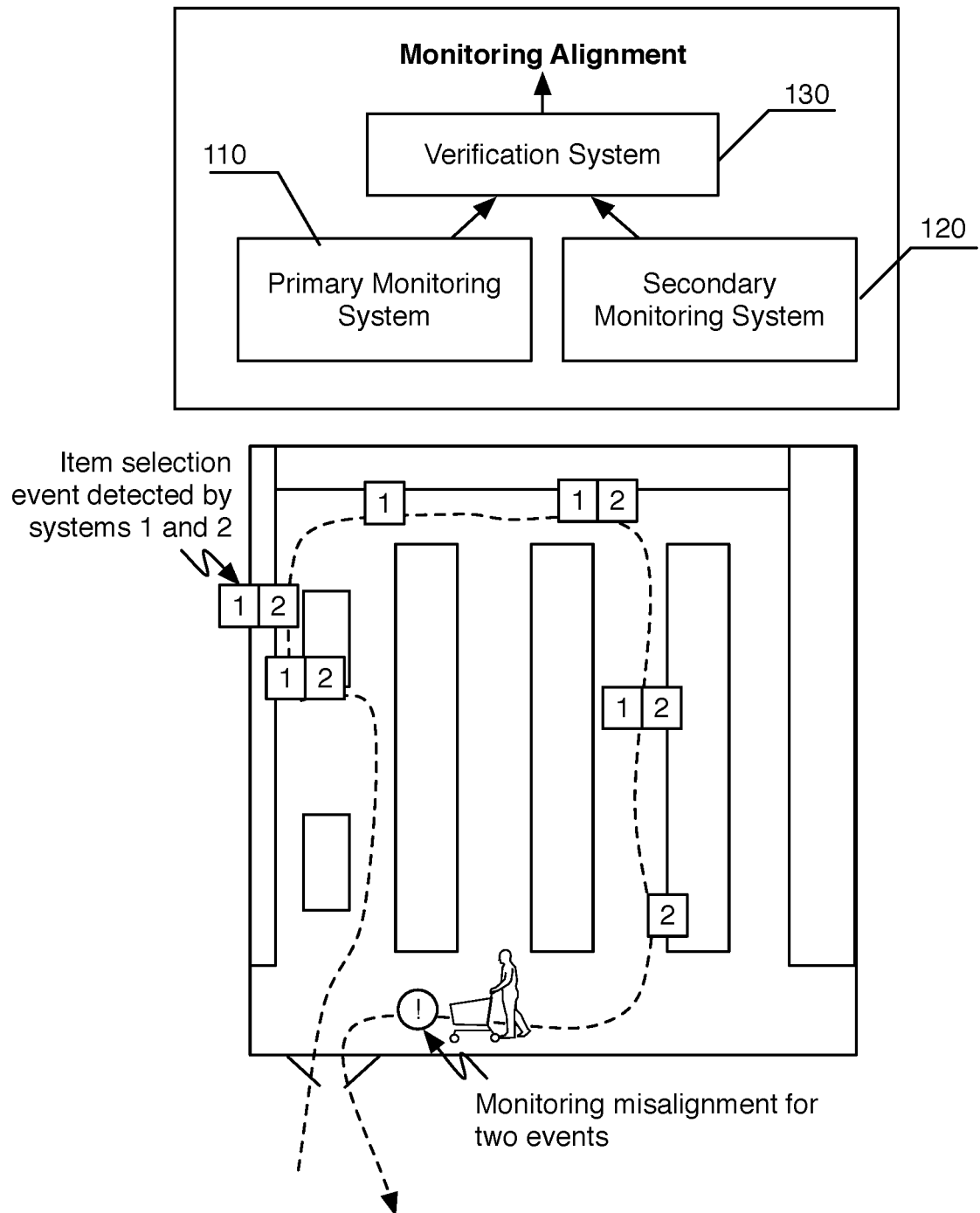
FIG. 1 is a schematic representation of a system of a preferred embodiment.

The following description of the embodiments of the invention is not intended to limit the invention to these embodiments but rather to enable a person skilled in the art to make and use this invention.

1. Overview

The system and method for multiple-factor verification of vision-based interactions functions to enable computer vision (CV) driven applications to be verified through complimentary monitoring systems. There are a variety of nascent opportunities for CV-driven applications and vision-based systems in the field of commerce, retail, hospitals, logistics/operations, security, consumer applications, home tools, automotive industry, emerging human-computer interfaces, and/or other fields. The system and method may enable enhanced performance and security in many of these new applications.

Computer vision can be used in a variety of ways such as identifying or classifying objects, tracking objects, tracking or identifying people, detecting object interactions, detecting gestures and events, and/or applying computer vision to other applications. This is a system and method that can use redundant and complementary monitoring systems to verify these and other CV-driven tasks as well as complex combinations of such monitoring approaches.

In particular, the system and method can be applied in the field of commerce. In particular, the system and method can be used in the field of retail for detecting and tracking product selection of a customer or customers for the intent of offering an altered checkout experience. In one preferred use-case, the system and method may be used within a system that offers a form of "checkout free" shopping otherwise described as automatic self-checkout.

The system and method may additionally or alternatively be used within a system that offers some form of expedited or otherwise augmented checkout.

Herein, automatic checkout is primarily characterized by a system or method that generates or maintains a virtual cart (i.e., a checkout list) during the shopping process of a user or users, with the objective of knowing the possessed or selected items for billing. The checkout process can occur when a customer is in the process of leaving a store. The checkout process could alternatively occur when any suitable condition for completing a checkout process is satisfied such as when a customer selects a checkout option within an application. In performing an automatic checkout process, the system and method can automatically charge an account of a customer for the total of a shopping cart and/or alternatively automatically present the total transaction for customer completion. Actual execution of a transaction may occur during or after the checkout process in the store. For example, a credit card may be billed after the customer leaves the store.

As one example variation, the system and method can employ two or more monitoring systems for evaluating selected items intended for purchase by a user during a checkout session. The two systems can operate substantially independently to evaluate the "cart" of a customer. A comparison of the independent evaluations can then be applied in determining how to process or respond to one or both evaluations. In particular, this can be applied to the checkout process where a primary system is used for automatic self-checkout where a virtual cart is generated within the store environment. The second system for item evaluation can then be used to determine if automatic checkout can proceed for that user or if alternative handling of the user should be used (e.g., manual checkout, or receipt checking). The two system are preferably selected to be relatively "orthogonal" in nature, which is to say at least a subset of the attack vectors for one monitoring system are different from the attack vectors for the second monitoring system. In general the two monitoring systems have different monitoring resolution, capabilities, and limitations which when used parallel can be addressed when resolving monitoring misalignment to determine if an action needs to be taken to determining how to address the misalignment.

An environment as used herein characterizes the site where the system is installed and operational. The system and method can be made to work for a wide variety of environments. In a preferred implementation, the environment is a shopping environment such as a grocery store, convenience store, micro-commerce & unstaffed store, bulk-item store, pharmacy, bookstore, warehouse, mall, market, and/or any suitable environment that promotes commerce or exchange of goods or services. An environment is generally the inside of a building but may additionally or alternatively include outdoor space and/or multiple locations. In alternate use cases, the environment can include a household, an office setting, a school, an airport, a public/city space, and/or any suitable location. The environment can be a locally contained environment but may alternatively be a distributed system with wide coverage.

Multi-factor verification of the system and method can be used in determining if a suspected error is present in the evaluation of a customer's cart (either because of inaccuracy of one of the monitoring systems or because of attempted deception by the customer). Applied over multiple shoppers and over multiple checkout events, the system and method may improve operation of the checkout process either through directing changes in one or both monitoring systems, changes in the store operations, changes in the products, or other suitable changes. In one implementation, the system and method could direct worker-based monitoring of customers (e.g., specify when and whose carts to spot check). A multi-factor approach in some implementations may be used to offer a more behavior-driven metric taking into account independent monitoring "perspectives", which may be used for improved user experiences in cases where one of the monitoring systems would have resulted in a more involved checkout process.

The system and method may alternatively be applied to other CV-driven applications or in specific CV-driven applications. Some embodiments of multi-factor verification may specifically leverage the affordances of the system and method described herein. For example, a security barrier embodiment of the system and method may leverage one or more forms of monitoring beyond basic security tag monitoring for enhanced shoplifting detection. Such a solution may allow more ubiquitous monitoring of products, allowing CV-based monitoring to be used for products that traditionally could not be tagged or that would not be cost-effective to monitor with a physical security tag. Such a solution could similarly, allow the CV monitoring to mitigate false-positive events (e.g., false alarms).

Herein, this system and method will be described as being applied to the exemplary retail-related application. However, the system and method can be applied to other fields of CV-driven applications. For example, the system and method can be used with autonomous vehicles for verifying computer vision modeling of the physical world.

As one potential benefit, the system and method may enhance user trust through improving reliability of an automatic checkout system. Various aspects of the system and method may also mitigate negative impact when a monitoring system makes an error or is unable to accurately monitor item selection. For example, item inspection as a secondary check performed by a worker can be selectively directed to a small subset of customers to minimize the number of inspections while addressing issues and finding adversarial customers. Additionally, inspections can be reduced to key inspection tasks (e.g., "check for package of AAA batteries") for a worker to minimize the amount of time during an inspection.

As another potential benefit, the system and method may enable operationally robust checkout technology built on lower accuracy monitoring systems. The cooperative-use of the two or more monitoring systems may result in a performance level greater than either of the two monitoring systems. For example, a CV-based automatic checkout system can be used while accuracy is operating at a first accuracy level (e.g., 80% accurate), but the effective performance can achieve an accuracy level greater than the first accuracy level (e.g., 99%) by using a secondary monitoring system to detect and address issues.

As another potential benefit, some embodiments of the system and method can be used in training and enhancing performance of one or more monitoring systems. For example, a CV-based automatic checkout system can be deployed for use alongside a supplementary monitoring system, and that CV-based automatic checkout system can improve through training provided through operation. The system and method can mitigate performance deficiencies of any one system, but can also enable the CV-based automatic checkout system to improve with the goal of independently achieving desired performance.

As another potential benefit, some embodiments of the system and method may additionally mitigate shoplifting, system manipulation, or other forms adversarial behavior. Customers attempting to steal, confuse, or manipulate the system can preferably be detected. As the attack vectors of the system are minimized, "bad behavior" does not have to be addressed harshly and the user experience can simply guide such customers to either to stop adversarial behavior or to stop visiting.

Additionally, the system and method may enable a monitoring system that is more robust to adversarial attacks by reducing attack vectors. Someone trying to exploit a weakness of one monitoring system will be presented with the challenge of simultaneously getting around a secondary monitoring system.

Similarly, the system and method may also provide a safe avenue for user coaching when a user is unfamiliar with how to interact in an environment offering a user experience powered by the monitoring system(s). This may occur in CV-driven applications that enable checkout free shopping or expedited checkout where a customer accidentally selects items in a way that results in poor accuracy. For example, an honest user may unknowingly act in such a way that confuses a primary monitoring system, but the system and method can facilitate identifying such cases and presenting an opportunity for a worker or other agent to aid in resolving the issue. Such CV-driven applications are new forms of human-computer interface and so multiple monitoring systems may serve to aid in coaching of usage. On the other hand, the system and method could be robust to repeated attempts to exploit a vulnerability.

As discussed, the system and method is preferably used in automation of the checkout process. Specifically, the system and method can be applied to enabling automatic self-checkout where a customer is enabled to select items for purchase and complete a checkout transaction without any or little interaction with a worker. The system and method can also be modified and applied in other fields of CV-driven applications. In place of evaluating items selected by users, the two or more monitoring systems can be used in monitoring other events and activities. Examples of other CV-driven applications include: item rental; security monitoring; interaction monitoring of a user for various areas of operations like commerce, retail, service providers, manufacturing, construction, healthcare, etc.; facial or biometric detection; robotic automation/autonomous vehicles; and/or other fields of application.

2. Exemplary Implementations

There may be various embodiments of the system and method where different combinations of monitoring systems are used. Three exemplary embodiments can include a primary CV monitoring system used with a variety of possible secondary monitoring systems, a point-of-sale (POS) system used along with a secondary CV monitoring system, and a user application for self checkout used along with a secondary CV monitoring system.

In the first exemplary embodiment, a secondary monitoring system is used to validate the performance of a CV-based system using environmental surveillance. A variety of secondary monitoring systems may be used. In one example, dispersed active inventory sensors such as RFID tags or smart shelves with scales or targeted inventory sensors can be used to provide higher accuracy view of a subset of items in the store. In another example, a user profile system can be used to provide a general prediction of confidence level of the customer. In another, consumer operated cameras (e.g., smart glasses) can form a first CV monitoring system and an environment installed imaging system can form a second independent monitoring system.

In the second exemplary embodiment of above, the CV-system can be used as a secondary monitoring system to that of a POS system for worker or customer facilitated checkout. The CV-system in one variation can be used in detecting attempted theft and alerting a worker at the POS system of such activity. In another variation, this can be used as a setup for training and improving a CV-system and/or for on-boarding new products.

In the third exemplary embodiment of above, a user application can be used by a customer to manually enter items for purchase and used as a primary monitoring system. In this implementation, the primary monitoring system may be any suitable type of user controlled application such as a smart phone application, a smart watch application, smart glasses application, or any suitable type of application for a computing device. In a related implementation, a smart cart or a similar hand held system could be used by a customer to automatically, semi-automatically, and/or manually enter items for purchase and used as a primary monitoring system. The secondary monitoring system can be used in the background to validate if the customer is honestly, accurately, and correctly entering their selected items for purchase. A CV-system is preferably used as secondary monitoring system. Alternatively, other secondary monitoring systems such as a partially dispersed RFID tags or smart shelves can be used in providing some random sampling of activity and/or tracking high value items.

Such systems depend on cooperative users that can be trusted to accurately, correctly, and honestly enter items. Such systems may have numerous issues when used without use of the system and method such as when: a customer accidentally miscounting the number of items entered; customer thinking they entered an item when there was a system error; or a customer deliberately not scanning an item to avoid paying. A secondary monitoring system could be used in a variety of ways to improve these systems.

In one variation, portions of the primary monitoring system (e.g., a smart cart system) could forgo convoluted processes for major vulnerabilities. For example, a CV-monitoring system could be used in creating a record of items entered or not entered into the system.

In another variation, a secondary monitoring system with only partial coverage of the environment may be used to provide redundant monitoring for a subset of products thereby spot checking a customer's use of the primary monitoring system or providing more robust monitoring for key areas (e.g., for expensive/valuable products, difficult to monitor products, products with high shrinkage, etc.).

3. System

As shown in FIG. 1, the system for multiple-factor verification of vision-based interactions preferably includes at least two monitoring systems used in combination and a verification system 130 integrated with the at least two monitoring systems. Each monitoring system preferably generates a system output. The at least two system outputs can then be used in combination as processed by the verification system 130 to establish monitoring alignment and/or a resulting interaction event. The system may function to dynamically direct a variety of systems.

When applied to automating the checkout process, the two monitoring systems can each be configured to generate a monitoring system output related to selected items and/or user activity associated with item selection. In some preferred monitoring systems, the system output is a determined list of selected items (e.g., a virtual cart of items). In other monitoring systems, the monitoring system output could be a list of possible or candidate selected items (but not necessarily selected), a list of a subset of selected items (e.g., only used in identifying some portion of the selected items), a user activity score (e.g., a score related to "normal" shopping behavior), a user history score (e.g., historical evaluation of past activity), and/or other monitoring system outputs. Preferably, the monitoring systems generate a monitoring system output that is associated with a particular user. In other words, each customer in a store may have different interactions or events detected and tracked by the at least two monitoring systems. As an example of an alternative variation, the secondary monitoring system could track different events based on location and time without associating to a particular customer. In this example, the time and location of interactions by a customer as indicated by a primary monitoring system can still be evaluated for alignment by mapping the records of the secondary monitoring system to corresponding records of the primary monitoring system.

At one or more instances, the system outputs from the two or more monitoring systems can be used in combination and processed by the verification system 130 in evaluating monitoring alignment. Monitoring alignment can relate to: scoring the degree of agreement, identifying discrepancies, predicting errors, generating an overall or product-level confidence level, generating a resulting virtual cart, evaluating some conditional logic based on properties of both the monitoring systems, and/or form any suitable assessment. The conditional logic could determine an action corresponding to various properties or aspects of the two or more evaluations.

The monitoring alignment can be a metric reflecting overall accuracy of the monitoring or more specifically the cart modeling for a checkout process. The monitoring alignment may alternatively include detailed evaluation of the accuracy of a checkout process. For example, individual items may be identified as being part of the cart or a discrepancy between the monitoring systems. In some cases, the output of the verification system 130 may be alerts to special conditions or used in triggering some interaction response. Monitoring alignment may additionally or alternatively be an updated modeling output. For example, an updated checkout list can be a final checkout list for use in a checkout process. The updated checkout list is preferably a more accurate list of items for purchase.

The system can be comprised of any two suitable monitoring systems. Preferably, one of the two monitoring systems is used as a primary and the other monitoring systems are used as a secondary factor of verification. The primary/secondary role of a monitoring system can additionally change within the system. For example some regions of the store may primarily rely on a first monitoring system 110 and use a second monitoring system 120 as a secondary monitoring system, while in a second region, the first monitoring system 110 is the secondary system and the second monitoring system 120 is used as the primary system. Alternatively, there may be no priority applied to the monitoring systems, where the monitoring systems are used in a substantially equal cooperative manner.

Figure 2A:
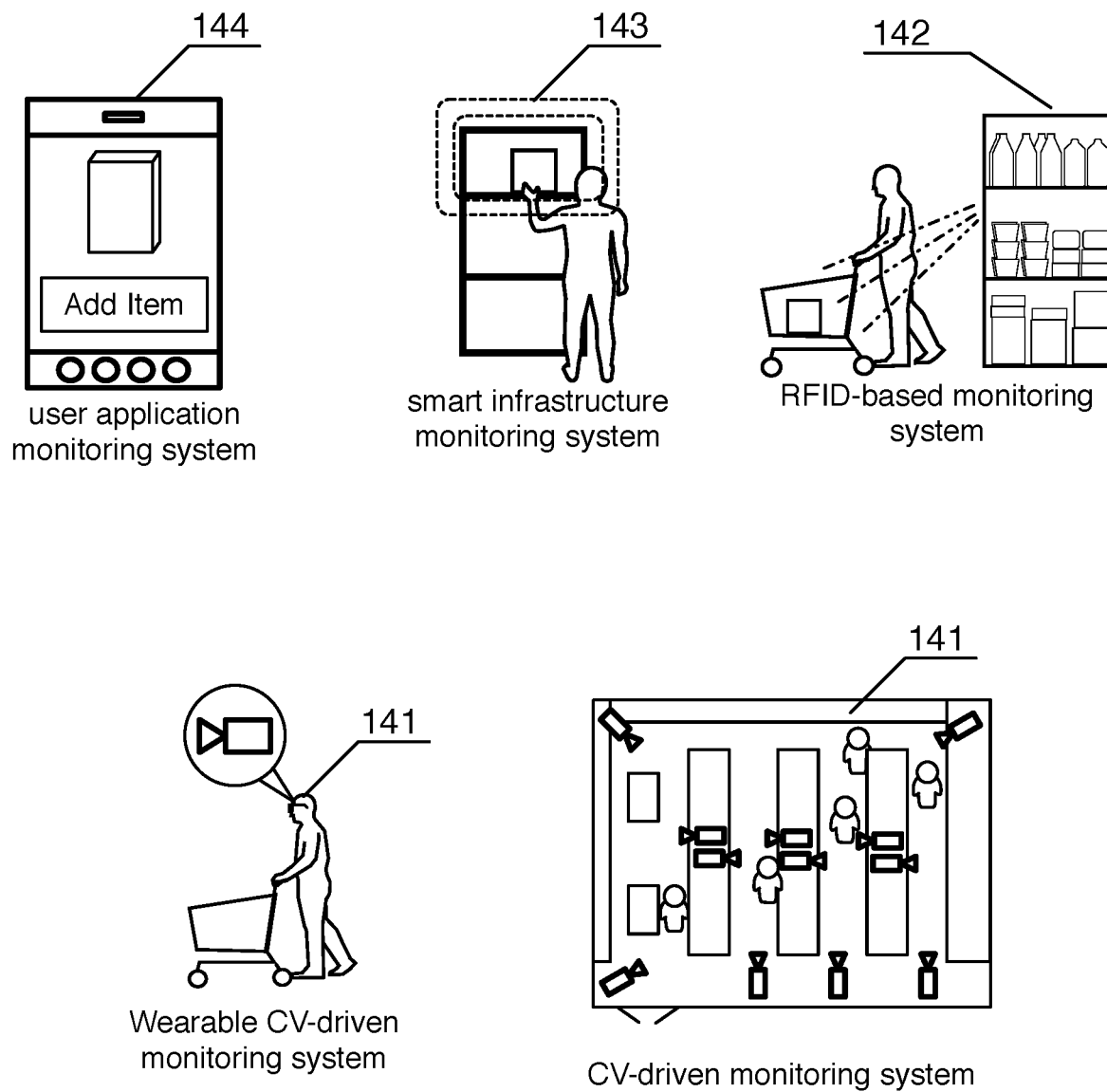
FIGS. 2A and 2B are a schematic representations of potential monitoring system options.
Figure 2B:
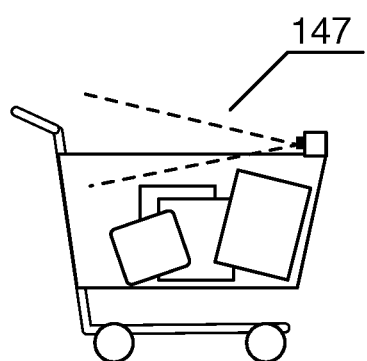
Figure 2B:
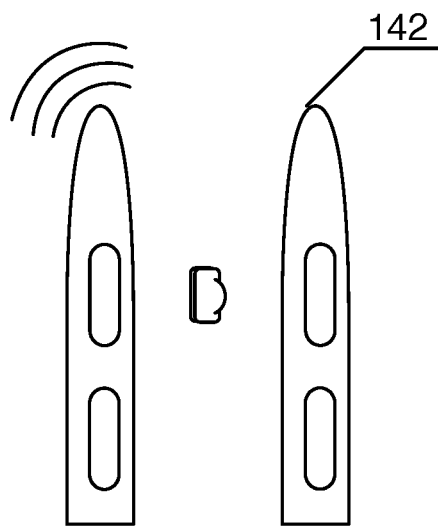
Figure 2B:
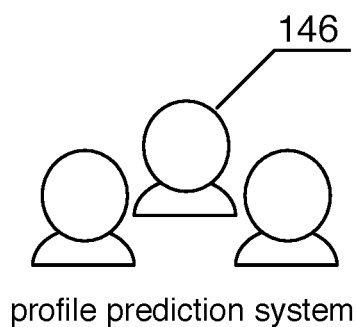
Figure 2B:
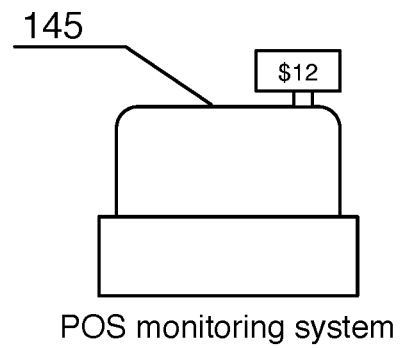

A variety of combinations of monitoring systems can be used. Some preferred monitoring systems that may be used in various combinations include a CV monitoring system 141, an RFID-based monitoring system 142, a Smart infrastructure monitoring system 143, a user application 144, smart cart system, a POS monitoring system 145, a profiling prediction system, a security tag barrier system, and/or other suitable forms of monitoring systems as shown in FIGS. 2 and 2B.

CV Monitoring System

A CV monitoring system 141 functions to process and generate conclusions from one or more sources of image data. The CV system can be configured to perform person detection; person identification; person tracking; object detection; object classification (e.g., product identification); object tracking; extraction of information from device interface sources; gesture, event, or interaction detection; scene description; and/or any suitable form of information collection using computer vision and optionally other processing techniques. More preferably, the CV monitoring system 141 is configured to perform a sequence of the above processes in a coordinated manner for more advanced tracking. The CV monitoring system 141 is preferably used to drive CV-based applications of an interaction platform. In the case of CV-driven retail, the CV-driven imaging system may facilitate generation of a virtual cart during shopping, tracking inventory state, tracking user interactions with objects, controlling devices in coordination with CV-derived observations, and/or other interactions. The CV-driven imaging system will preferably include various computing elements used in processing image data collected by an imaging system. In particular, the CV-driven imaging system is configured for detection of agents (e.g., people) and generation of a virtual cart based on interactions between people and products.

A CV monitoring system 141 will include at least one form of an imaging system that functions to collect image data within the environment. The imaging system preferably includes a set of image capture devices. The imaging system might collect some combination of visual, infrared, depth-based, lidar, radar, sonar, and/or other types of image data. The imaging system is preferably positioned at a range of distinct vantage points and preferably forms substantially ubiquitous monitoring within the environment as described below. However, in one variation, the imaging system may include only a single image capture device. The image data is preferably video but can alternatively be a set of periodic static images. In one implementation, the imaging system may collect image data from existing surveillance or video systems. The image capture devices may be permanently situated in fixed locations. Alternatively, some or all may be moved, panned, zoomed, or carried throughout the facility in order to acquire more varied perspective views. In one variation, a subset of imaging devices can be mobile cameras (e.g., wearable cameras or cameras of personal computing devices).

In one variation, a subset of imaging devices can be mobile cameras (e.g., wearable cameras or cameras of personal computing devices). For example, in one implementation, the CV monitoring system 141 could operate partially or entirely using personal imaging devices worn by agents in the environment. The image data collected by the agents and potentially other imaging devices in the environment can be used for collecting various interaction data.

In a preferred implementation, at least a subset of the image capture devices are oriented for over-head monitoring, wherein the image capture devices collect a substantially aerial perspective. In a shopping environment, the imaging system preferably includes a set of statically positioned image devices mounted with an aerial view from the ceiling. The aerial view imaging devices preferably provide image data across stored products monitored for virtual cart functionality. The image system is preferably installed such that the image data covers the area of interest within the environment (e.g., product shelves). In one variation, imaging devices may be specifically setup for monitoring particular items or item display areas from a particular perspective.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous though discontinuities of a region may be supported. Additionally, monitoring may monitor with a substantially uniform data resolution. In some variations, a CV monitoring system 141 may specifically have an imaging system with only partial coverage within the environment. For example, a CV monitoring system 141 used for secondary monitoring may generate a partial checkout list.

Large coverage, in one example, can be characterized as having greater than 95% of surface area of interest monitored. In a shopping environment, this can mean the shelves and product displays as well as the shopping floor are monitored. Substantial uniform data resolution preferably describes a sensing configuration where the variability of image resolution and/or coverage of different areas in the environment are within a target range. In the exemplary case of automatic checkout CV-driven applications, the target range for image resolution is sufficient to resolve product-packaging details for product identification.

Ubiquitous monitoring may optionally include the characteristic of redundant monitoring. This may involve having redundant coverage from multiple vantage points. For example, an item on a shelf may be visible by two different cameras with adequate product identification resolution and where the cameras view the item from different perspectives. In an environment like a grocery store this could mean 10-200 cameras distributed per an aisle in some exemplary implementations. Ubiquitous monitoring may be particularly used in scenarios where the CV monitoring system 141 is used as a primary monitoring system. Though ubiquitous monitoring is not a requirement for all variations described herein.

Similarly, the system may additionally include other computer input or output devices across an environment. The system and method can be used in the collection of sensor data and/or generation of an output in addition to or as an alternative to video and/or image data. Other forms of devices such as microphones, Bluetooth beacons, speakers, projectors, and other suitable devices could additionally or alternatively be integrated into system modules that may be installed across an environment. These additional sensors in some variations may be used in combination within a single monitoring system.

In a store environment (e.g., a grocery store), the CV monitoring system 141 can be configured to additionally track a checkout list for automatic checkout and/or expedited checkout at a checkout station. In one variation, the CV monitoring system 141 may be used to generate a virtual cart, which may be performed in a manner substantially similar to the system and method described in US Patent Application publication No. 2017/0323376, filed 9 May 2017, which is hereby incorporated in its entirety by this reference. In other settings like an industrial, office, or hospital setting, the CV monitoring system 141 may be used to monitor worker actions and operations. In environments like a gym or other areas it may track activity. Herein, the use case of tracking item selection for facilitating checkout is used as a primary example, but the system is not limited to such uses.

The CV monitoring system 141 can include a CV-based processing engine and data management infrastructure. The CV-based processing engine and data management infrastructure preferably manages the collected image data and facilitates processing of the image data to establish various modeling and conclusions relating to monitoring objectives. For example, the selection of an item and the returning of an item are of particular interest. The data processing engine preferably includes a number of general processor units (CPUs), graphical processing units (GPUs), microprocessors, custom processors, FPGA's, and/or other computing components. The computing components of the processing engine can reside local to the imaging system 112 and the environment. The computing resources of the data processing engine may alternatively operate remotely in part or whole.

The CV monitoring system 141 may additionally or alternatively include human-in-the-loop (HL) monitoring which functions to use human interpretation and processing of at least a portion of collected sensor data. Preferably, HL monitoring uses one or more workers to facilitate review and processing of collected image data. The image data could be partially processed and selectively presented to human processors for efficient processing and tracking/generation of a virtual cart for users in the environment.

In a preferred embodiment, the CV monitoring system 141 is a primary monitoring system that is validated by a secondary system. The secondary system can be used in combination with the CV monitoring system 141 to spot check the virtual cart from the CV monitoring system 141, to assess the likelihood of the virtual cart, or make any suitable type of determination.

The CV monitoring system 141 may alternatively be used as a secondary system. As a secondary system, the requirements and constraints may be less for the CV monitoring system 141. Accordingly, the CV monitoring system 141 could provide a range of general visually extracted assessments of person activity. As opposed to providing a full orchestration of CV monitoring that interprets multiple complex tasks, the CV monitoring system 141 could provide base CV-driven modeling such as event tracking, people-object proximity tracking, and the like. Similarly, a secondary CV monitoring system 141 may not have full coverage within the environment and include an imaging system with partial coverage of the environment. As such the CV monitoring system 141 may not include large-scale imaging device coverage. In such a scenario the output of the CV monitoring system 141 (e.g., the system evaluation) may be a partial product selection list.

In one variation, the CV monitoring system 141 may be used as a secondary monitoring system and configured to generate a virtual cart as above but with lower accuracy requirements. This can be used to spot-check a primary monitoring system such as a POS system, a user application, and/or an alternative implementation of a CV monitoring system 141.

In another variation, the CV monitoring system 141 may be used as a secondary monitoring system and configured to create a list of candidate products. The candidate products may provide some conditions for products identified in a primary monitoring system.

In one variation, the CV monitoring system 141 may be used as a secondary monitoring system to generate a shopping behavior evaluation for a user. In one variation, generating a shopper behavior evaluation can include tracking customer location within an environment, which may be used to deduce particular patterns. For example, the motion path through the store of a user may indicate some probability of buying some number of items or particular types of items. In another variation, generating a shopper behavior evaluation can include detecting product interactions. For example, a generalized list of probably product interaction events may be tracked per customer in the store. Product interaction events may be a record of any suitable type of product interaction. In one variation, the list of product interaction events may not positively identify when a product was picked up and kept by the customer. However, a list of possible product interactions may be used along with a primary monitoring system that definitively tracks item selection to draw some conclusions of customer behavior. In another variation, generating a shopper behavior evaluation can include configuration to detect a set of suspicious interaction events.

Additionally, a CV monitoring system 141 may transition between status as a secondary and primary monitoring system. This can be used for onboarding a system in a new store. Primary/secondary status may additionally be dynamically invoked based on different conditions. For example, if the CV monitoring system 141 enters a particular monitoring state for a particular customer, the CV monitoring system 141 may be changed to a secondary monitoring system and a new monitoring system may be used as the primary monitoring system.

RFID-Based Monitoring System

An RFID-based monitoring system 142 functions to use tracking of tags attached to items for tracking item position/activity. More generally, the system may include a radio frequency tag monitoring system. A radio frequency (RF) tag monitoring system may not include uniquely identifiable tags. As one example, a security tag barrier system may be a RF tag monitoring system where there is only one "identity" associated with the tags used in the environment. Alternatively, the security tag barrier system can be an RFID-based monitoring system 142. Herein, RFID-based monitoring system 142s are primarily used as the example, but one skilled in the art could recognize that alternative systems such as a general RF tag monitoring system, a Bluetooth beaconing system, some active beaconing, acoustic beaconing, or other suitable forms of physical tag monitoring may be used.

An RFID-based monitoring system 142 preferably includes at least one RFID reader and a set of RFID tags detectable by the RFID reader. The RFID tags may be passive or active. The RFID tags are preferably attached to items in the environment such that the coupled items can be tracked through the environment. The RFID readers could be placed in any suitable location to track location. RFID readers could be integrated with product storage/shelving, checkout regions, exits and entrances, and/or at any suitable location. Preferably, a distributed network of tag readers is used, which in some variations may be used to triangulate tag position.

In one implementation, the RFID tag system is used in selective monitoring of a subset of the inventory items. For example, a sampling of different inventory items may be tracked through the RFID system. The items that are tracked though provide a sanity check to the primary system. The RFID-based monitoring system 142 could alternatively be a primary monitoring system.

An RFID-based monitoring system 142 is preferably used as a secondary system. The RFID-based monitoring system 142 could involve a set of products adding a tag, detecting a set of tags (e.g., one or more) in a particular region. For example, if a subset of the products selected by the customer include tagged products detectable by the tag reading system, then an at least partial product selection list could be generated.

Smart Infrastructure Monitoring System

A Smart infrastructure monitoring system 143 functions to perform other forms of product, equipment, or people tracking. Smart infrastructure monitoring system 143 may include or be used alongside an RFID-based monitoring system 142. A Smart infrastructure monitoring system 143 can include digital scales, proximity sensors, mechanical sensors, or other suitable forms of sensing. In one particular variation, digital scales and/or item tracking sensors can be integrated with shelving units to monitor individual items during storage. The Smart infrastructure monitoring system 143 is preferably configured to track item removal from a shelving unit. The Smart infrastructure monitoring system 143 may also track that an item was removed by an individual person or by a possible set of people. In one variation, a removed item is positively associated with a detect user. In this way, the Smart infrastructure monitoring system 143 may generate an at least partial checkout list of a customer. In another variation, a removed item may be simply be tracked as having been selected within the store (possibly within a particular time window). This may be used to cross reference item selection as detected by a different monitoring system.

A Smart infrastructure monitoring system 143 may be used as a secondary monitoring system as with the RFID system. In some implementations, the Smart infrastructure monitoring system 143 can be used in combination with the RFID-based monitoring system 142 in providing selective monitoring of a subset of items in an environment. The scales and sensor fusion approaches to monitoring may be used in select areas or for select products such as products commonly purchased, with a high value, or selected for any suitable reason.

User Application Monitoring System

A User application monitoring system 144 functions to utilize user participation in generating a model of their activity. In the checkout use case, a user application preferably describes any checkout system that promotes user-facilitated adding of items to a checkout list. In one particular implementation, a User application monitoring system 144 is an app on a smart phone that allows a user to enter product items for purchase using CV detection of a viewed item, scanning of a barcode or product identifier, and/or manually entering a product listing. The "virtual cart" of the shopper can be fully managed by the customer. As this relies on customer trust, a secondary monitoring system can provide a form of verification.

A User application monitoring system 144 of alternative use cases may facilitate accounting for other forms of user activity. This may be a user application on a smart phone, or wearable computer, or other suitable device.

In some embodiments, a User application monitoring system 144 can be used as a primary monitoring system that is validated through a secondary monitoring mode. In one preferred implementation, a user application may be used as a primary monitoring system, and a CV monitoring system 141, an RFID-based monitoring system 142, a Smart infrastructure monitoring system 143, and/or other form of monitoring system can be used in assessing the validity of what the user claims to be purchasing as indicated by the app, and what has been detected by the secondary monitoring system.

As a related variation, the system could include a smart cart monitoring system 147, wherein shopping baskets, carts, or other item holding devices may be used to track item selection as items are stored in the corresponding vessel. A smart cart monitoring system 147 could be used in a similar manner as User application monitoring system 144s. A smart cart monitoring system 147 may be used to automatically, semi-automatically, and/or manually enter items for purchase and used as a primary monitoring system. A smart cart monitoring system 147 may include a cart or vessel used to hold items and some item sensing system. The item sensing system may be a local CV monitoring system 141, RFID monitoring system, or other suitable automatic sensing systems. The smart cart may additionally include more basic sensing elements such as a barcode scanner, a digital scale, an internal measurement unit or other suitable motion/orientation sensing elements (e.g., accelerometer, gyroscope, altimeter, magnetometer, etc.), and/or other suitable elements. The smart cart preferably includes a communication module to wirelessly communicate with the rest of the system. In yet another variation, the smart cart may include a user interface such that a user application may be operated on the cart.

While the smart cart may be used in many scenarios as a primary monitoring system, the smart cart could alternatively be used in a secondary monitoring capacity. Use as a secondary monitoring system may enable the smart cart monitoring system 147 to be configured for a narrower scope of monitoring. In one variation, wirelessly connected scale at the bottom of a smart cart could be configured to wirelessly relay scale activity data (e.g., changes in weight) to a central system.

POS Monitoring System

A POS monitoring system 145 functions to provide data collected from a system setup for point of sale transactions such as those used for worker facilitated checkout or self-checkout kiosks. Data collected from a POS monitoring system 145 can be used in a variety of ways with a complementary monitoring system.

The POS monitoring system 145 could be an existing POS checkout station such as one staffed by a worker or a self-checkout kiosk. A POS checkout station used with the system is preferably connected or includes a communication interface such that items entered into the POS system can be detected and communicated to the verification system 130 or another suitable remote computing system. In another variation, the POS monitoring system 145 may be an "add-on" device or system that can extract POS-based information. In one implementation, a barcode scanner proxy module can be inserted in between barcode entry devices and the central processing unit of a POS system. The barcode scanner proxy module can preferably establish a data connection to the verification system 130.

In one variation, a POS monitoring system 145 can be a primary system that is used in driving the transactions. A secondary system, like a secondary CV-driven system, can be used to detect mistakes in operating the POS system or to detect bad actors. A POS monitoring system 145 could similarly be used as a secondary system.

Profile Prediction System

A Profile prediction system 146 functions to use a predictive engine to provide context of evaluating another monitoring system. The profiling system is preferably used as a secondary system. Preferably, a Profile prediction system 146 can use data of a particular person, class of person, the store, or other data scopes to generate predictions and/or assess likelihood of predictions from another monitoring system. In particular, the Profile prediction system 146 can use shopping history to determine likelihood of accuracy of a checkout process as detected by a primary system. In one variation, the Profile prediction system 146 outputs. For example, customers that historically attempt to mislead the system may be more likely to do so again. In another example, customers that historically confuse the system due to legitimate shopping habits may also be more likely to do so again. In another example, a shopper selecting items that are predictively aligned with past behavior is probably being monitored accurately, and a shopper modeled as having selected items by a primary system may be determined as likely not modeled accurately if those items are not aligned with expected purchase patterns.

A profile can additionally be updated for different visits/shopping experiences. In some cases, the Profile prediction system 146 may even be used as a tertiary monitoring system.

The Profile prediction system 146 may use a variety of types of data such as purchase history, completeness of a profile (e.g., address, name, email, phone number, etc.), age verification, premium membership, social media account connection, biometric profile, payment information, and/or other details. In some implementations, users with more complete and verified information will be more accountable and therefore may be less likely to deliberately mislead the system.

These various monitoring systems may be used in any suitable combination.

The verification system 130 functions to coordinate evaluation of monitoring alignment between the at least two monitoring systems. As discussed above, the system is preferably implemented in connection with another computer-based system such as an enhanced checkout system for retail environments, which may provide features like checkout-free shopping, accelerated checkout processing at a POS station, theft prevention monitoring, and the like.

The system may include a data management system and other supplementary system elements of a computing platform, service, or application. The system may additionally include or interface with a user application and/or connected computing devices.

The data management system functions to store user-records and/or user-account information. The data management system may additionally manage, include, or interface with the verification system 130.

User Applications and/or connected computing devices function as client devices that may participate within the interactions of the system. A user application instance or a connected computing device are preferably addressable endpoints within the system such that the data management system or an alternative component can transmit data or information can be communicated to the user application instance or the connected computing device. An SDK and/or API may be provided such that third party applications can establish such integration with a CV monitoring system 141 and/or platform. In one variation, the system can include a worker application that connections to a service of the platform such that worker directions can be communicated to the worker.

4. Method

Figure 3:
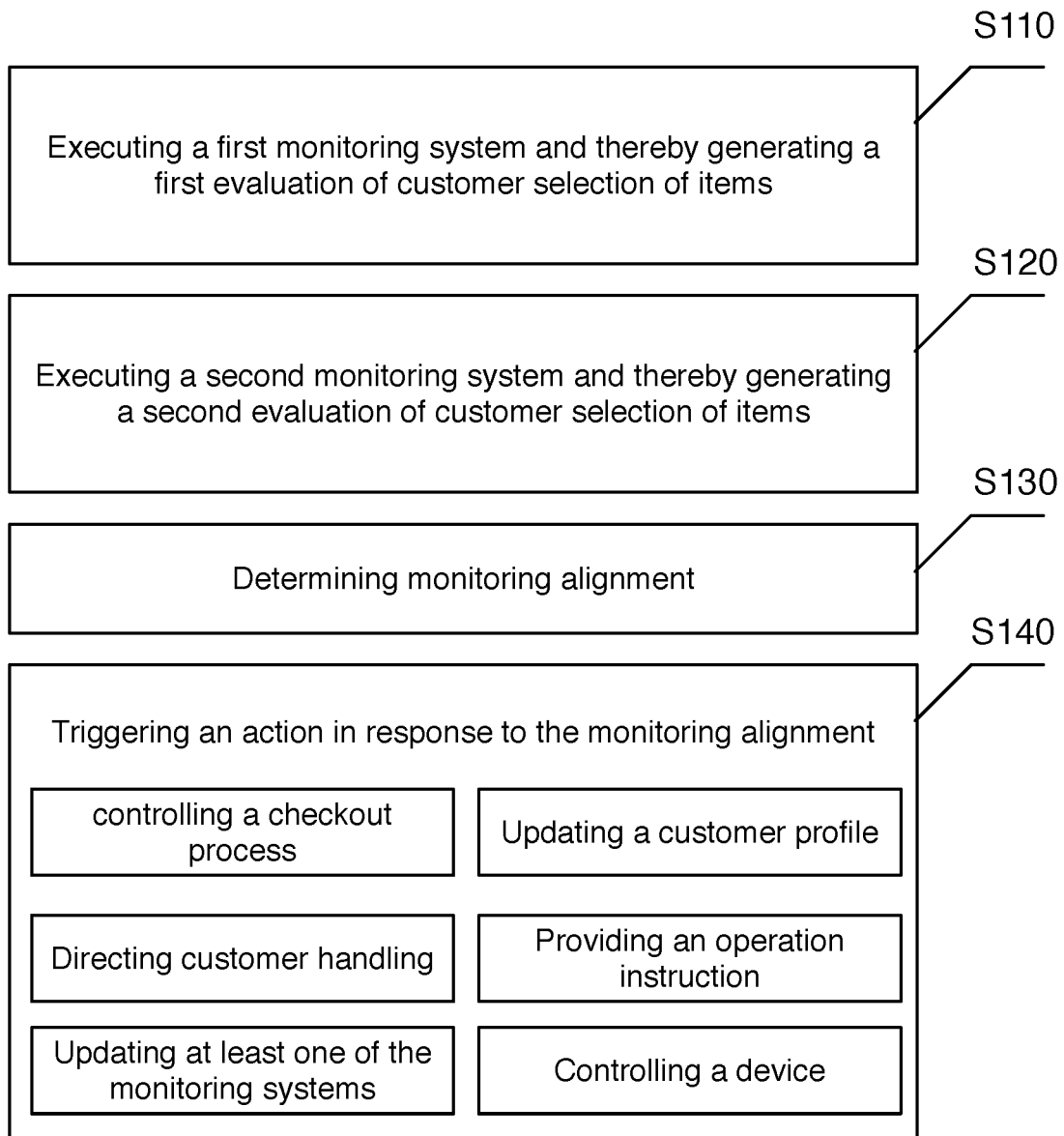
FIG. 3 is a flowchart representation of a method of a preferred embodiment.

As shown in FIG. 3, a method of a preferred embodiment can include executing a first monitoring system and thereby generating a first evaluation S110, executing a second monitoring system and thereby generating a second evaluation S120, determining monitoring alignment S130, and triggering an action in response to the monitoring alignment S140.

The method is primarily described as it could be applied to retail. A customer is generally a human shopper but could alternatively or additionally include shopping carts, a shopping bag, an automated machine, and/or any suitable tracked entity. The method could alternatively be applied to any sensor/prediction driven application that may be retail related or outside of retail. The method is preferably applied in the situation where one of the first monitoring system and the second monitoring system is a computer vision monitoring system. More preferably, the computer vision monitoring system is a computer vision monitoring system with multiple cameras distributed across the environment.

The method is preferably implemented by a system substantially similar to the one described above, but the method may alternatively be implemented by any suitable system. Any suitable combination of monitoring systems can be used, and any suitable use as a primary or secondary monitoring system can be used. Preferably, the first evaluation is generated independent from the second evaluation, and the second evaluation is generated independent from the first evaluation. In some variations, where more than two monitoring systems are used, multiple groups of monitoring systems may be used in combination, but preferably at least one monitoring system is independent from a subset of other monitoring systems.

Block S110, which includes executing a first monitoring system and thereby generating a first evaluation, functions to generate a prediction or collect some data metric using a first approach. More specifically, block S110 can function to collect a primary system output associated with customer selection of items. Herein, the use of first and second is not intended to imply primary or secondary, but for consistency, examples generally refer to the first monitoring system as the primary monitoring system (if there is a primary system).

The first evaluation is preferably a data output from the first monitoring system. The evaluation of one preferred variation is an evaluation of selected items by a customer. The evaluation of selected items can include a list of items planned to be used in completing a purchase transaction. This may form the checkout list or "virtual cart" of an automatic checkout shopping experience. Different implementations may use different monitoring systems.

The first evaluation may alternatively be any suitable type of output from the monitoring system, which depends on the type of monitoring system. The evaluation may alternatively be a classification of a user, a history of interactions by a user, a map of tracked position during a visit to an environment, and/or any suitable type of evaluation.

In one variation, a CV monitoring system is used in collecting image data, applying a CV-based processing, and generating the first evaluation. CV-based processing functions to model item and customer interactions based on the image data. Preferably a variety of techniques may be used. Preferably, applying CV-based processing can include tracking a set of users through the environment; for each user, detecting item interaction events, updating items in a checkout list based on the item interaction event (e.g., adding or removing items). The checkout list can be a predictive model of the items selected by a customer, and, in addition to the identity of the items, the checkout list may include a confidence level for the checkout list and/or individual items. The checkout list is preferably a data model of predicted or sensed interactions. Other variations of the method may have the checkout list be tracking of the number of items possessed by a customer or detection of only particular item types (e.g., controlled goods like alcohol, or automatic-checkout eligible goods). The CV monitoring system may use algorithmic approaches applying traditional computer vision techniques, deep learning models, machine learning, heuristic modeling, and/or other suitable techniques in processing the image data. The CV monitoring system may additionally use HL in evaluating image data in part or whole.

In another variation, an RFID-based monitoring system may be used in detecting the selection of an item and assigning the selected item to a customer through RFID tag monitoring. More generally an RF monitoring system includes detecting tag presence and associating tag presence to product presence in one or more regions. This may further be extended to tracking a tag through a number of locations or throughout an environment (e.g., using triangulation of an active RFID tag). For example, a product may include an attached or embedded RFID tag that can be detected as being moved into proximity of the customer. In some cases, the customer may be operating a device with an RFID reader or other suitable RF-enabled device such as a smart cart. Smart infrastructure monitoring can additionally or alternatively be used. More generally, an RFID-based monitoring system may include detecting presence of a tag associated with an item. This can be associated with the presence of an item outside of its normal location (e.g., the shelf), presence in a particular zone (e.g., checkout region, store exit), possession by a user, or any suitable type of conclusion.

As with some other monitoring system variations, an RFID-based monitoring may not have a direct way of assigning detected items to a specific user or tracking a user through the store. In one implementation, the RFID-based monitoring system interrogates a user for detectable RFID tags at the point of interaction such as at a checkout station, wherein there is no explicit mapping to a user and it is more built into the interaction that the associated user will be present.

In another variation, a user application monitoring system may depend on user interaction in part to establishing a user indicated selection of items. A user application monitoring system variation may involve collecting item selection through a user interface and generating a checkout list. For example, a user may scan barcodes of products for purchase, manually enter product information, select products from a menu, or enter items for purchase in any suitable manner. A smart cart could similarly generate a checkout list. A smart cart may use a variety of sensor to identify products.

In another variation, a POS monitoring system such as one that can be used in a checkout aisle of a store may be used to provide the first evaluation. When a worker operates the POS monitoring system, the first evaluation can be a worker-based evaluation of selected items.

Block S120, which includes executing a second monitoring system and thereby generating a second evaluation, functions to develop a parallel and/or complementary evaluation. The first evaluation is preferably used in validating the first monitoring system and/or flagging particular scenarios warranting concern. In some cases, the secondary monitoring system may be a partial monitoring system that does not provide full monitoring of an environment. In other words, the secondary monitoring system may provide spot-checks. The primary and secondary monitoring systems may alternatively not be assigned a priority wherein the notion of primary and secondary does not impact weighing or prioritization of one over the other. Preferably, the attack vectors of the secondary monitoring system are not aligned with those of the primary monitoring system.

The type of evaluation can be the same, similar, or alternatively different. Evaluation type characterizes the format and content of an evaluation. When the type is shared, the first and second evaluations may have similar data such as when creating a virtual cart of predicted items selected by a user. Accordingly, in one variation, the second evaluation is an evaluation of customer selection of items similar to the first evaluation. The type may also be of similar types. For example, a first evaluation may attempt to be a full representation of selected items, and a second evaluation may attempt only a partial representation of selected items. The evaluations can also be of different evaluation types.

In one variation, a first evaluation may attempt to be a full representation of selected items, and a second evaluation may represent a sub-property of interaction activity. The full set of properties of an interaction activity is preferably sufficient to generate some characterization of the interaction. For a monitoring system that can generate a reasonable approximation of a full checkout list would capture the full set of properties of shopping interaction. A sub-property of interaction activity characterizes one or a subset of factors that can be used in describing the full interaction. Examples of a sub-property that may be detected by a second monitoring system can include user location, occurrence of events without specific labeling, and the like.

In another variation, a second monitoring system may characterize qualitative assessments such as the level of caution to treat a customer based on detected behavior and/or past profile history.

The second evaluation, especially when used in a non-primary capacity, may be a data output with partial reporting of the events of interest. For example, the second evaluation may make no attempt to fully predict a checkout list for automatic checkout. In one variation, the second evaluation may provide a partial list of items detected likely in the checkout list. This may be generated by systems like the RFID-based monitoring system or smart infrastructure monitoring systems where the systems perform partial monitoring of the products in an environment. In another variation, the second evaluation may provide a probability rating of a wide range of products. This may be generated by a CV-monitoring system or an alternative monitoring system to track customer location through the store such that product likely-hood can be modeled based on the regions visited by the user. In another variation, a profile prediction system may be used as a generalized check on the primary monitoring system.

Block S130, which includes determining monitoring alignment, functions to use the first and second evaluations to make a determination. Determining monitoring alignment is preferably performed in association with a particular customer or alternatively checkout instance (e.g., the checkout process of a group of users). The first and second evaluations are analyzed in combination.

In one variation where the first and second evaluations both have evaluations of the same or similar type, block S130 may include comparing item selection evaluations and detecting discrepancies. For a given customer, determining monitoring alignment can include comparing selected items associated with a first customer in the first evaluation to selected items associated with the first customer in the second evaluation. In this variation, determining monitoring alignment functions to compare across all items of a checkout list. This may be used to detect errors or issues where the two item selection evaluations do not fully align. For example, if the first and second monitoring systems predict different items there is a cause for a concern. Full alignment across a list of selected items would be an ideal scenario and may be used to allow or enable interactions with the computing system such as automatic checkout (e.g., the automatic execution of a transaction for the modeled selected items). Determining monitoring alignment can additionally resolve discrepancies such that a perfect match is not always a requirement for interactions such as automatic checkout. In one variation, an evaluation may characterize confidence levels for predictions of individual items or the list in general may be processed between the two. Such confidence levels could be incorporated into determining the monitoring alignment. Additionally, the item properties of mismatched items in the first and second evaluations may be incorporated into determining the monitoring alignment. For example, the modeling of a jar of pickles with low confidence in one evaluation may be resolved with the modeling of a jar of relish with high confidence. Product visual similarity and high confidence in one may still indicate high alignment between the two monitoring systems.

In some variations, the second monitoring system may only provide a partial monitoring of relevant interactions. As such a one-to-one comparison of items would not be performed. Determining monitoring alignment would preferably include verifying that a set of selected items associated with a first customer of the second evaluation maps to at least a subset of selected items associated with the first customer of the first evaluation. In an implementation with a CV-monitoring system and an RFID-based and/or smart infrastructure monitoring system, the CV monitoring system may be configured to target providing a full representation of items selected by a customer. The secondary monitoring system may be used to spot-check these items. In some cases, the environment may be configured so key items (e.g., expensive items or items commonly stolen) can be monitored by the secondary monitoring system. For example, a store may select to add RFID tags to a subset of products. During a checkout evaluation for a customer, three items detected of an RFID-based monitoring system are preferably mapped to corresponding items of an evaluation from a CV monitoring system.

In another variation, a qualitative evaluation relating to confidence, trust, or levels of caution may be used to determine how to assess another evaluation. For example, a virtual cart generated by a CV monitoring system will generally have confidence levels associated with the various items predicted as having been selected. The confidence level thresholds may be augmented in response to an evaluation from a profile predictive system.

In an implementation with a primary user application monitoring system and a secondary CV monitoring system, the CV-system can operate to produce a redundant virtual cart for a customer. The redundant virtual cart can be compared to the virtual cart managed by the user and used to provide some security around user trust.

Various other implementations can similarly use the at least two evaluations in combination.

Block S140, which includes triggering an action in response to the monitoring alignment, functions to use the monitoring alignment to take some action. Some responses may be active in that they can directly alter the checkout process and/or system actions during a shopping experience. Other types of responses may be passive in that they trigger a background action, which may or may not impact subsequent or previous interactions.

Some examples of response actions can include enabling or disabling a checkout process, directing customer handling, scoring a customer profile, providing an operation instruction, updating at least one of the monitoring systems, controlling a device, and/or other suitable actions. Multiple actions could additionally be triggered at different times.

In one variation, enabling or disabling checkout process functions to regulate the checkout process. More generally enabling or disabling the checkout process is part of controlling a checkout process in coordination with the monitoring alignment. Controlling a checkout process preferably involves permitting a checkout process at a checkout system for items of at least one of the first or second evaluation when monitoring alignment satisfies an alignment condition. Conversely, controlling the checkout process may involve executing a regulating action to the checkout process which may halt or alter a checkout process, signal some issue to a worker or device, or perform any suitable action to address a potential issue. As one preferred implementation, controlling the checkout process will include communicating an alert to the checkout system when monitoring alignment does not satisfy the condition.

Control of a checkout process is preferably applied as a customer is ending a shopping session (e.g., leaving a store, entering a checkout zone, etc.) The checkout process may be selectively disabled or enabled based on the result. Specifically, regulating a checkout process preferably includes communicating to a checkout system the status of a checkout attempt. For example, when integrating with a POS system, an error message may be communicated to the POS system preventing or halting the checkout process. For example, a customer trying to use automatic self checkout when paying at a payment kiosk may be prevented from completing the checkout process at that station and may be directed to speak to a customer representative. Enabling or disabling a checkout process may in turn determine directing of a customer, messaging to a customer, controlling some security system, or other systems.

In another variation, directing customer handling can function to alter the operational interaction with a customer. In some cases, this may involve influencing how a human worker response to a customer. This variation may include generating worker instructions based on the monitoring alignment and communicating the worker instructions to a worker management device that guides a worker in inspecting customers. The worker instructions are preferably generated and/or communicated when monitoring alignment does not satisfy an alignment condition. The worker instructions may be directed at a variety of tasks. Some preferred uses could involve directing how and when to inspect a customer. There may be various forms of inspection. For an improved user experience the system may be biased towards specifying the least intrusive inspection option appropriate to address the alignment issue. For example, the worker instructions may: direct inspection of one item or a subset of items that have monitoring misalignment; direct full checkout list verification; direct performance of a cursory checkout (e.g., low intrusion but signaling vigilance), directing the customer to a particular checkout station to repeat/perform checkout, or any suitable action.

The worker management device can be an application or device used by a worker to assist in monitoring the environment. In one implementation, the application can be executable on a phone or wearable computer (e.g., connected audio device, smart watch, smart glasses, etc.) where alerts or notifications can be triggered when a customer, bag, or item should be inspected. In another implementation, the worker management device could be a dedicated device that signals events or conditions. For example, a worker management device could be a basic connected device that lights up one or more different light signals to indicate conditions like "permit customer", "spot check customer", and "stop customer".

Worker instructions can proactively promote a distribution of inspections across customers. The determination to inspect a customer may be customized for different customers. Customer handling can be based entirely on comparison of the first and second monitoring systems, but may additionally integrate balancing checks across the population of customers.

During an inspection, the method may include collecting a third evaluation of item selection, which is preferably used in modifying the list of selected items so that a purchase transaction can be completed. The third evaluation can additionally be used as training feedback to the first and/or second monitoring systems.

In another variation, scoring a customer profile can function to update a record associated with a customer. In some cases the history of monitoring alignment may be used determine handling in subsequent visits. When monitoring alignment is outside of the norm, a user's history of monitoring alignment can be used as a signal to more cautiously evaluate subsequent checkout processes for that user. Scoring a customer profile preferably involves updating or creating a user profile of a customer. The user profile is preferably updated with information about the monitoring alignment. In one variation, a history of monitoring alignment or particular issues with an evaluation can be recorded in the user profile. Repeated occurrences of monitoring alignment may trigger actions in subsequence visit. Accordingly, the method may additionally include a customer during a subsequent visit, accessing a stored user profile of the customer, and triggering an action based in part on the user profile. This may include augmenting checkout processing directing worker actions or any suitable action.

In another variation, providing an operation instruction can function to generate a recommendation or instruction used in altering how the environment is run. The operation instructions or reports may be generated and used in augmenting the store or products to enhance performance of the one or both monitoring systems. The operation instruction may relate to a product(s) or the store in general. Operation instructions may include an operational instruction that specifies at least one of: item stocking placement (or other stocking variables), configuration of at least one of the first or second monitoring systems, which items to monitor, pricing of items, and/or other forms of instructions. As one example, an operation instruction may include directing packaging of products or marking of products. Select products may be identified as benefiting from visual packaging changes. In some cases, the form of visual augmentation may also be recommended. For example, placing stickers on one type of product may improve detection. This may be used to enhance the performance of a CV monitoring system. As another example, an operation instruction may include directing positioning of products. Rearranging the stocking of products may result in better performance when close proximity leads to increased errors. RFID tagging or placing for monitoring by smart infrastructure may other forms of recommendations.

In yet another variation, updating at least one of the monitoring systems functions to use the result of the monitoring alignment as feedback into one or both monitoring systems. This can be particularly useful in training systems such as CV monitoring system using another monitoring system like a POS monitoring system. For example, triggering an action can include updating the computer vision monitoring system in response to the monitoring alignment. The training model, configuration of imaging devices (e.g., position, picture/video quality). In one variation, results of a checkout process can be used to train the monitoring systems. In another variation, collected data resulting in a monitoring error can be flagged for inspection or retraining.

As described herein, there are multiple permutations of monitoring system combinations, which may be applied for a variety of objectives and triggering different types of tasks. Some permutations are reflected in the exemplary implementations of FIGS. 4-8 and those described below, but the method is not limited to these implementations.

Figure 5:
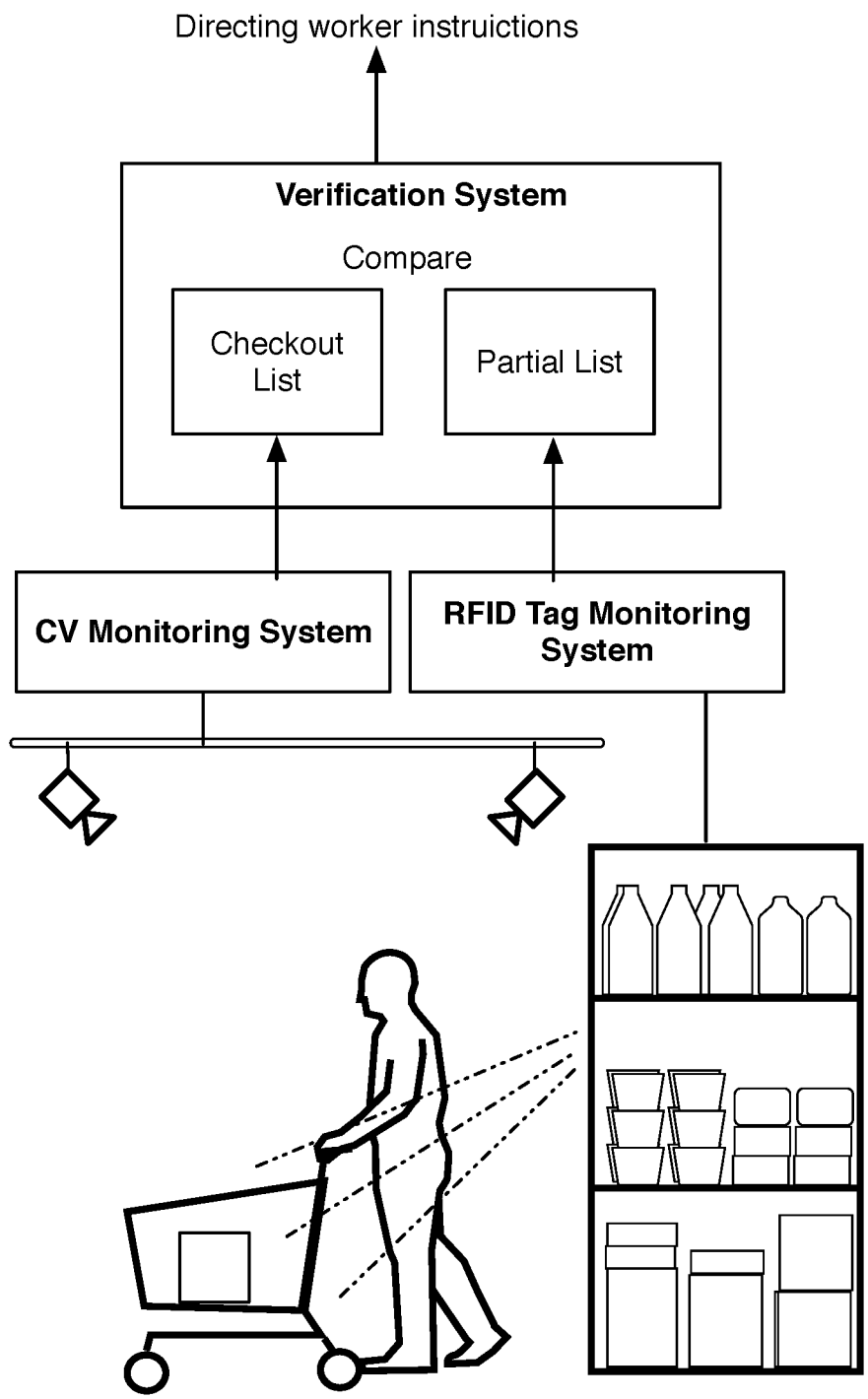

One exemplary variation can use a CV monitoring system as a first monitoring system and a RF monitoring system as the second monitoring system. In one variation, this may be applied to spot check a checkout list of the CV monitoring system using a partial item list of the RF monitoring system. Accordingly, the RF tag monitoring system can be an RFID tag monitoring system with an identifier mapped to at least one product. In this variation, the second evaluation can be an at least partial item selection list, and determining monitoring alignment can include comparing the at least partial item selection list to a selected item list of the first monitoring system. As shown in FIG. 5, an alternative variation may be applied to directing customer handling which is generally manifested through delivery of worker instructions.

In another variation, a CV monitoring system can be used in combination with a security tag detector barrier, which is used for monitoring theft/shrinkage detection. The security tag detector barrier is preferably a device positioned at an exit/entrance of the environment or any suitable region where it may be beneficial to checking for item removal.

Figure 6:
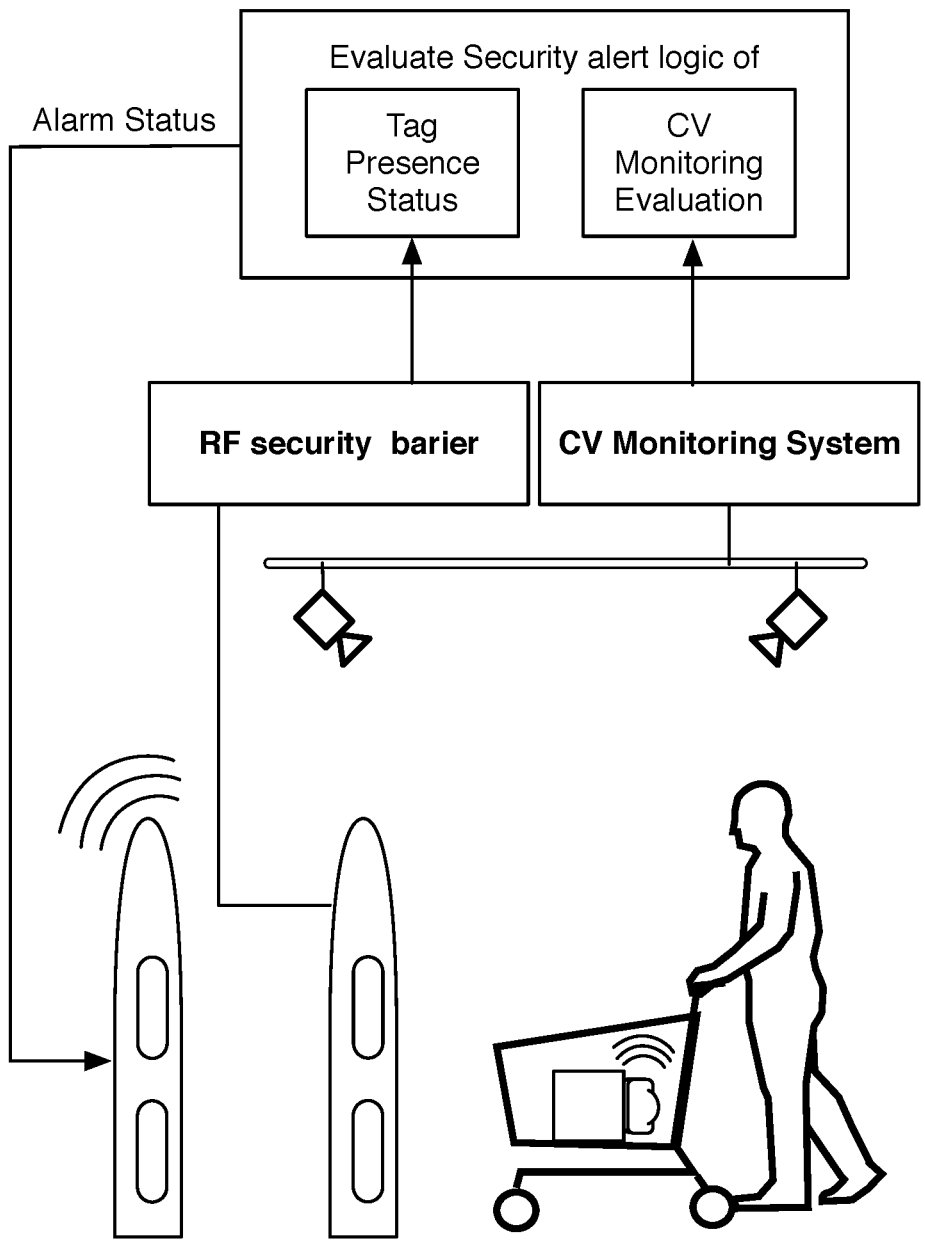
Figure 7:
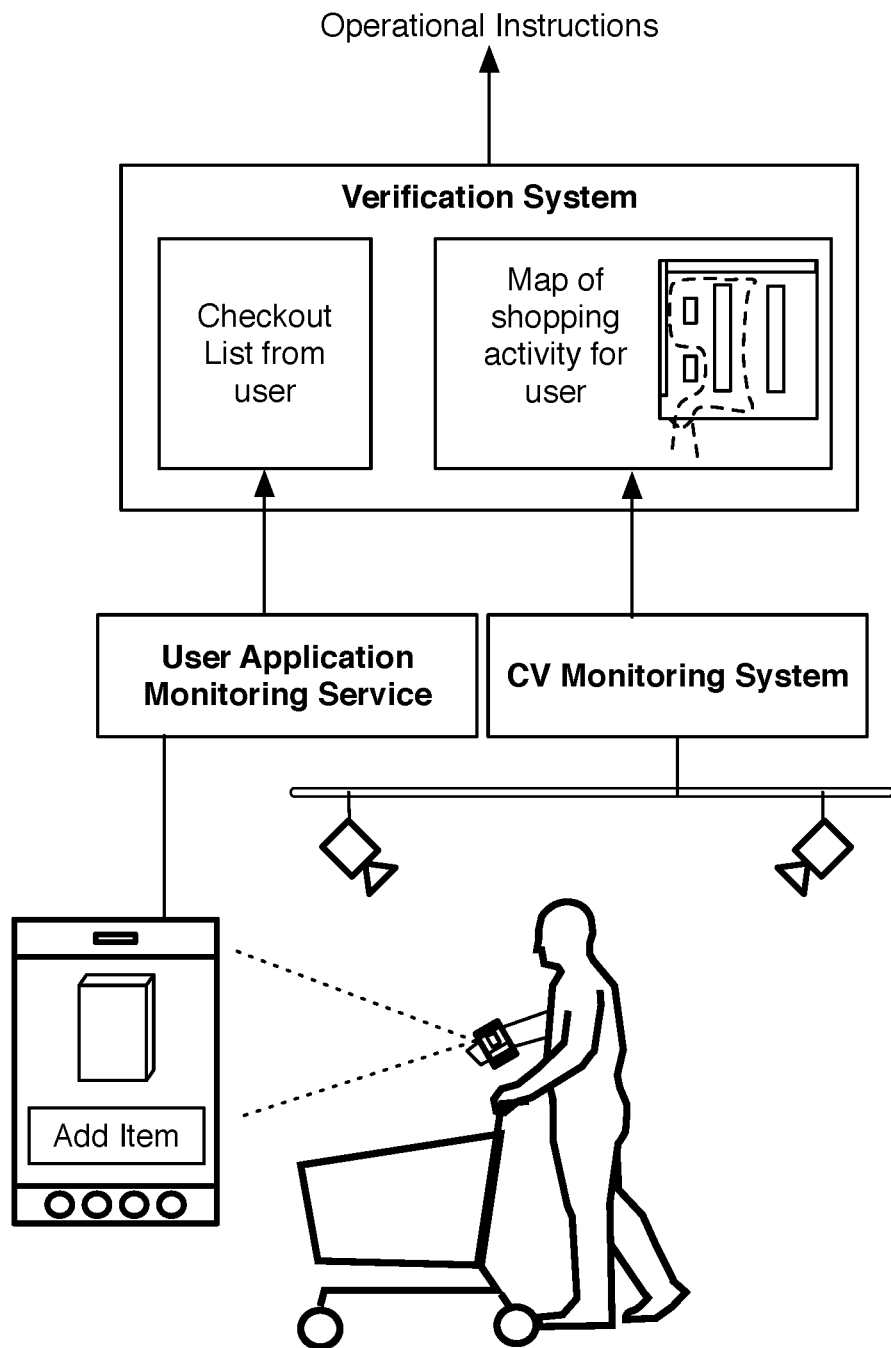

This variation may function to provide an enhanced tag detection barrier system that more intelligently generates an alert. The CV monitoring system can provide additional context to prevent false alarms (e.g., disabling an alarm when a product was purchased or properly tracked for automatic checkout) and/or to expand product monitoring beyond just items that have an attached tag. In one implementation, the security tag detector barrier generates an evaluation that is a binary signal that corresponds to tag presence within a monitored region of the barrier. In some implementations, item identity, proximity to the barrier and/or other data may be detected and used in coordinating when actions are triggered. Preferably triggering an action can include triggering an alarm of the security tag detector barrier based on monitoring alignment as shown in FIG. 6. This alarm may be used to signal when an item is being removed without payment. Alternatively, a positive alarm (more likely a "signal") can indicate when a customer is verified and approved for exiting. For example, as a customer approaches an exit the barrier may signal approval with a light, actuating a physical barrier (e.g., opening a door or lifting a gate).

In this variation, custom logic may be applied when evaluating monitoring alignment. For example, if a tag is detected and the evaluation of the CV monitoring system does not have a record matched to the tag an alarm may be triggered. If a tag is detected and the evaluation of the CV monitoring system has a high confidence rating, then an alarm may not be triggered. Similarly, if a tag is detected and the evaluation of the CV monitoring system has accounted for the system, then the alarm may not be triggered (and may be actively disabled to prevent an alarm triggered by the tag). If the CV monitoring system has low confidence, an alarm may be triggered based on user proximity to the barrier regardless of tag presence. If the evaluation of the CV monitoring system indicates detection or likely possession of an item for which payment has not or cannot be processed, an alarm may be signaled. This CV triggered alarm can allow monitoring of products that aren't tagged or may not be able to be tagged (e.g., small items).

Figure 4:
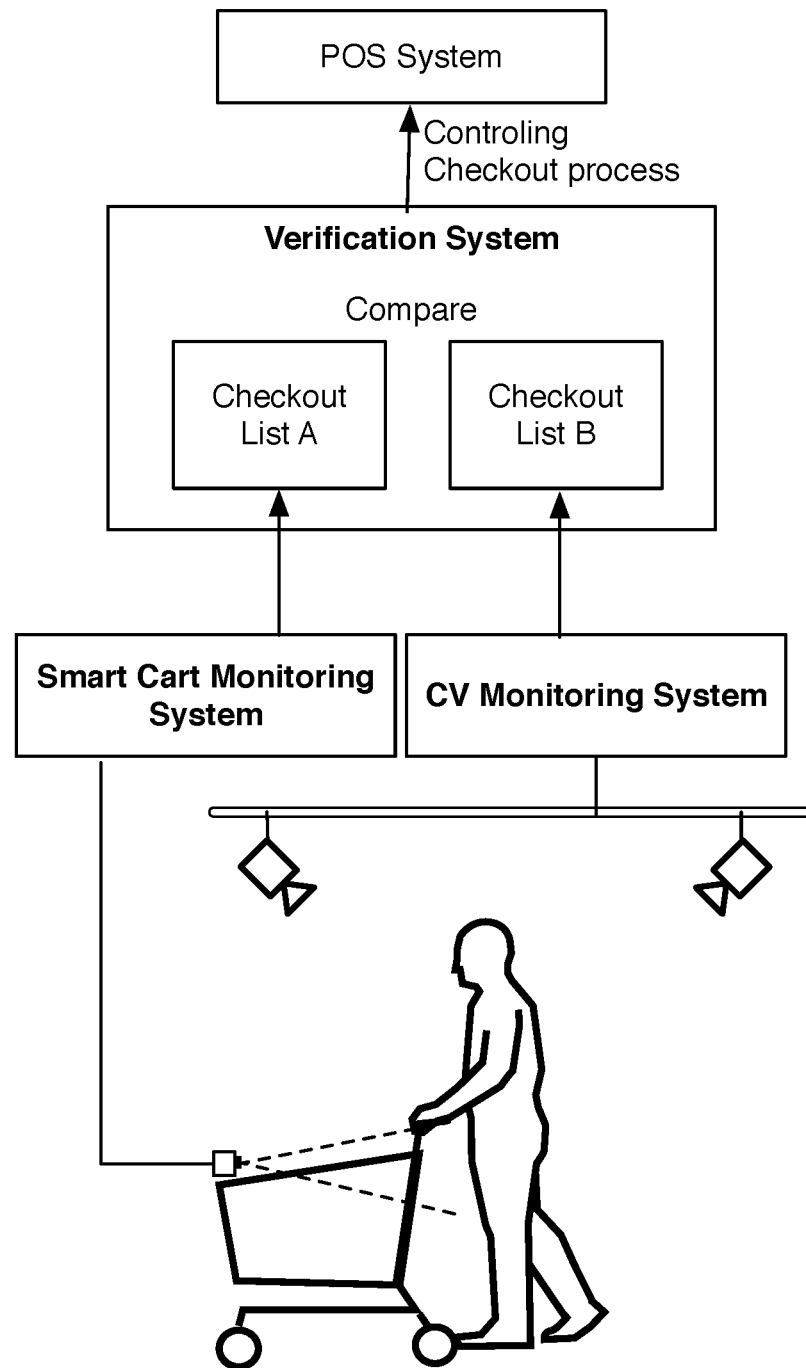
FIGS. 4-8 are schematic representations of exemplary applications of multi-factor monitoring to different use cases.

In another variation, a smart cart monitoring system can be used in combination with a CV monitoring system, which is used for at least partially redundant checkout list comparisons. In one variation, each monitoring system may attempt to provide a valid checkout list for an entire shopping experience of a user, wherein the monitoring alignment is a comparison of ideally redundant checkout lists. This checkout list comparison can be used in controlling a checkout process as shown in FIG. 4. Differences between checkout lists can indicate issues. In another variation, one monitoring system may generate a partial item selection list and captures at least a partial set of the checkout list predicted by the other monitoring system. In one implementation, the CV monitoring system is used to spot-check the smart cart system, wherein determining monitoring alignment partially verifies the item-based cart contents against partial item selection list from the CV monitoring system.

In another variation, a user application can be used in combination with a CV monitoring system, which can be used for at least partially redundant checkout list comparisons or other forms of checkout list verification. Executing the user application can include collecting item selection through a user interface and generating a checkout list. As with the smart cart variation above, the user application may be vulnerable to various types of attacks or unintentional error during use of the application. A computer vision monitoring system with partial imaging coverage of the environment (i.e., not every product is specifically monitored). Executing the first monitoring system comprises generating a partial item selection list; and wherein determining monitoring alignment partially verifies the checkout list contents against the partial item selection list. In another variation shown in FIG. 7, CV monitoring can be used to track a subproperty of the monitored interaction (or other suitable type of monitoring output) that relates to selecting items for a checkout process. For example, a mapped path through the environment of a user can be used to enable some location-based evaluation of the checkout list of the application. Those locations for example, could be used to identify a set of candidate products possibly weighted by likelihood or a similar metric. In an ideal scenario the subproperty of the interaction will corroborate the evaluation from the user application. In other variations, the CV monitoring system could be used to enable different forms of monitoring alignment verification.

Figure 8:
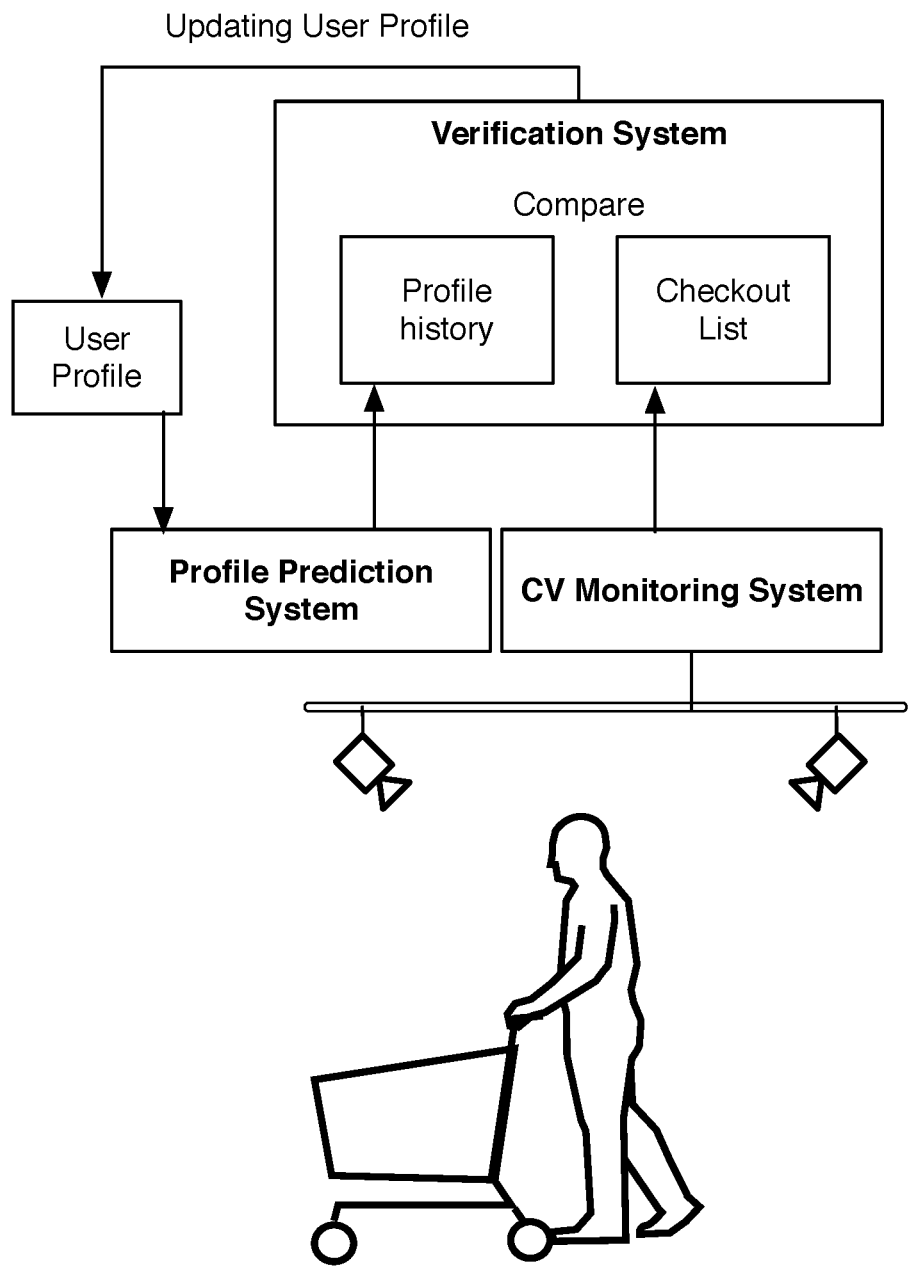

In another variation, a CV monitoring system can be used alongside a profile prediction system, which is used to use historical profile records in evaluating a checkout list or other metrics from the CV monitoring system. In this variation, determining monitoring alignment can include augmenting confidence level in the first evaluation through comparison of a historical profile record to a checkout list from the CV monitoring system. This may be used to compare historical shopping patterns to current checkout list. If a low confidence item is not expected based on historical records of that user (or of the environment) then this may be characterized as misalignment. If a user has previously been involved in one or more checkout sessions with monitoring misalignment or other forms of exceptions during the checkout process, then that may indicate a high confidence threshold to permit checkout. For example, users whose behavior triggers manual verification of items before will have these events recorded in the profile record and where the profile prediction system may generate an evaluation predicting a likely misalignment for one or more variety of reasons. This variation will generally involve updating the profile record so that an updated profile can be used in subsequent visits of a user to an environment as shown in FIG. 8.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for interaction monitoring in a retail environment comprising:
executing a user application monitoring system, comprising collecting item selection through a user interface of a user application operable on a computing device and generating a checkout list and thereby generating a first independent evaluation of customer selection of items from a first set of sensors;
executing a second monitoring system and thereby generating a second independent evaluation of customer selection of items from a second set of sensors;
determining, based on the first independent evaluation of customer selection of items and the second independent evaluation of customer selection of items, monitoring alignment by scoring a degree of agreement between the first independent evaluation and the second independent evaluation of a first customer; and
triggering an action in response to the monitoring alignment.

2. The method of claim 1, wherein the second monitoring system is a multi-camera, computer vision monitoring system.

3. The method of claim 2, wherein the first independent evaluation is generated independent from the second independent evaluation, and the second independent evaluation is generated independent from the first independent evaluation; and wherein determining monitoring alignment comprises comparing selected items associated with a first customer in the first independent evaluation to selected items associated with the first customer in the second independent evaluation.

4. The method of claim 2, wherein determining monitoring alignment further comprises verifying a set of selected items associated with a first customer of the second independent evaluation maps to at least a subset of selected items associated with the first customer of the first independent evaluation.

5. The method of claim 2, wherein determining monitoring alignment comprises evaluating a conditional logic based on properties of the first independent evaluation and the second independent evaluation.

6. The method of claim 1, wherein triggering an action comprises controlling a checkout process in coordination with the monitoring alignment.

7. The method of claim 6, wherein controlling a checkout process further comprises, when monitoring alignment satisfies a condition permitting checkout processing for items of at least one of the first or second independent evaluation, and when monitoring alignment does not satisfy the condition, communicating an alert.

8. The method of claim 1, wherein triggering an action comprises, when monitoring alignment does not satisfy an alignment condition, generating worker instructions based on the monitoring alignment and communicating the worker instructions to a worker management device.

9. The method of claim 8, wherein the worker instructions direct inspection of at least one item that has monitoring misalignment.

10. The method of claim 1, wherein triggering the action can comprise:
updating a user profile of the first customer, and
at subsequent visit, accessing the user profile, and augmenting checkout processing based in part on the user profile.

11. The method of claim 1, wherein the second monitoring system is a radio frequency tag monitoring system such that executing the second monitoring system comprises detecting tag presence and associating tag presence to product presence.

12. The method of claim 11, wherein the radio frequency tag monitoring system is a radio frequency identification tag monitoring system with an identifier mapped to at least one product; and wherein the second independent evaluation is an at least partial item selection list; and wherein determining monitoring alignment comprises comparing the at least partial item selection list to a selected item list of the user application monitoring system.

13. The method of claim 11, wherein the second monitoring system includes a radio frequency security tag detector barrier positioned at the exit of the environment, wherein the second independent evaluation is a binary signal of product presence; and wherein triggering an action triggers an alarm of the security tag detector barrier based on the monitoring alignment.

14. A non-transitory computer-readable medium storing computer-readable instructions that, when executed by one or more computer processors, cause the one or more computer processors to execute:
executing a user application monitoring system, comprising collecting item selection through a user interface of a user application operable on a computing device and generating a checkout list on and thereby generating a first independent evaluation of customer selection of items from a first set of sensors;
executing a second monitoring system and thereby generating a second independent evaluation of customer selection of items from a second set of sensors;
determining, based on the first independent evaluation of customer selection of items and the second independent evaluation of customer selection of items, monitoring alignment by scoring a degree of agreement between the first independent evaluation and the second independent evaluation of a first customer; and
triggering an action in response to the monitoring alignment.

15. The method of claim 1, wherein the second monitoring system is a computer vision monitoring system that comprises an imaging system with partial coverage of the environment such that executing the second monitoring system comprises generating a partial item selection list; and wherein determining monitoring alignment partially verifies the checkout list contents against the partial item selection list.

16. The method of claim 1, wherein the second monitoring system is a profile prediction system such that the second evaluation is a historical profile record; and wherein determining monitoring alignment comprises augmenting confidence level in the first evaluation through comparison of a historical profile record to the checkout list.

17. The method of claim 1, wherein the user application monitoring system is integrated into a cart.

18. The method of claim 1, wherein the user application monitoring system is operable on a personal computing device.

19. The method of claim 14, wherein the second monitoring system is a computer vision monitoring system that comprises an imaging system with partial coverage of the environment such that executing the second monitoring system comprises generating a partial item selection list; and wherein determining monitoring alignment partially verifies the item-based cart contents against the partial item selection list.

20. A system comprising of:
- a user application monitoring system operable on a computing device;
- a second monitoring system;
- one or more computer-readable mediums storing computer-readable instructions that, when executed by the one or more computer processors, cause the one or more computer processors to perform execution comprising:
  - executing the user application monitoring system, comprising collecting item selection through a user interface of a user application operable on a computing device and generating a checkout list and thereby generating a first independent evaluation of customer selection of items from a first set of sensors,
  - executing the second monitoring system and thereby generating a second independent evaluation of customer selection of items from a second set of sensors,
  - determining, based on the first independent evaluation of customer selection of items and the second independent evaluation of customer selection of items, monitoring alignment by scoring a degree of agreement between the first independent evaluation and the second independent evaluation of a first customer, and
  - triggering an action in response to the monitoring alignment.

* * * * *